Aug. 11, 1942.    A. AMIGO    2,292,593
INJECTION MOLDING APPARATUS FOR SYNTHETIC MATERIALS
Filed Feb. 24, 1939    2 Sheets-Sheet 1

Inventor
A. Amigo
By Glascock Downing & Seebold
Attys.

Aug. 11, 1942.  A. AMIGO  2,292,593
INJECTION MOLDING APPARATUS FOR SYNTHETIC MATERIALS
Filed Feb. 24, 1939  2 Sheets-Sheet 2

Inventor,
A. Amigo
by Glascock Downing & Seebold
Attys.

Patented Aug. 11, 1942

2,292,593

UNITED STATES PATENT OFFICE 2,292,593

INJECTION MOLDING APPARATUS FOR SYNTHETIC MATERIALS

Alfonso Amigo, London, England

Application February 24, 1939, Serial No. 258,309
In Great Britain February 11, 1939

12 Claims. (Cl. 18—30)

This invention relates to injection molding apparatus for synthetic materials.

Injection molding apparatus are known, in which the mold cavities communicating with a pressure chamber are arranged only on one mold-dividing surface. The mold-dividing surface intersects the pressure-chamber, so that one-half of the same is hollowed out in each mold plate.

This arrangement is very restricted in its application, and enables a relatively large number of mold cavities to be accommodated only if the diameter of the round pressure chamber is greatly increased or, with an elongated pressure chamber, if the same is made excessively long. In both cases the pressing surface area of the pressure chamber is greatly increased and therewith also the strength in tons of the press, and the weight of the hardened residue. Moreover, the molds become very heavy, expensive and difficult to manipulate.

A second very serious disadvantage of these known apparatus is connected with the removal of the hardened residues from the halves of the pressure chambers formed in the mold parts. Since the output per hour is the decisive factor for successful operation, long cleaning periods are a drawback. On the other hand, a poorly cleaned pressure chamber detrimentally affects the quality of the product and the durability of the mold.

The object of the present invention is to provide an improved injection molding apparatus which will enable the output to be substantially increased by overcoming the drawbacks above referred to, more particularly in the case of thermo-setting synthetic materials. With this object in view, according to the present invention, use is made, instead of a single mold-dividing surface, of a plurality of movable mold-dividing surfaces grouped around a stationary central member. In this way it is possible, with the same area of pressure chamber, substantially to increase the number of mold cavities to be accommodated and, therefore, also the output of pieces per shot, without increasing the tonnage. The mold-dividing surfaces are extended upwards, beyond the top of the central core and, after closure of the mold, form a cavity above the central core, which cavity functions as a pressure chamber in conjunction with an injection plunger fitting therein, the top of the central core forming the bottom of the pressure chamber. It will thus be seen, that the formation of a pressure chamber is dependent on the closure of the mold, the opening of which causes the said chamber to be disassembled. In this way the important technical advantage is attained that the waste material drops out when the molded piece is removed and that the mold is immediately ready for the next molding operation. Use may be made of any shape of central core as desired, the same being adapted to suit the character of the molded piece; it may be even in the form of a cylinder, cone or ball or of parts thereof. By dividing the central core and making the individual parts thereof movable relatively to one another, the number of mold-dividing surfaces is further increased.

The extensions of the mold-dividing surfaces forming the pressure chamber as well as the top of the central core are made removable, so that the parts exposed to exceptional wear owing to the action of the injection plunger can be readily exchanged. The actual mold surface is thereby also reduced to a minimum, which means a cheaper and quicker manufacture.

The exchangeable parts which come to lie against the central core contain on the sides which register with the corresponding mold-dividing surfaces the passages which connect the mold cavities with the pressure chamber. Since the said parts are made exchangeable, and are of simple shape, by employing longer or shorter parts or by grinding them off, the length of the passages can be adjusted in a very simple manner, without the mold parts themselves being affected.

The holding together of the mold parts and of these with the central core is accomplished by means of an internally conical ring which, by the application of a separate pressure in the direction of injection and simultaneously with the descent of the injection plunger, presses the mold parts against one another and against the central core before the injection plunger enters into the pressure chamber that is formed. Thus the mold and pressure chamber are being closed as the injection plunger descends, but some time is left for filling the pressure chamber before the actual injection period.

The opposite movement may be utilised to obtain a further advantage, by securing the mold or the pressure-chamber parts slidably in the conical ring referred to, so that when the latter is raised, according to the taper of the conical surface, they will first be pushed away from the central core and then, by means of a holding pin on the ring drawn upwards with the latter. In this way the opening of the mold and pressure chamber will be effected wholly or partly automatically after the withdrawal of the injection plunger from the pressure chamber.

Further, the apparatus may be so constructed that the central core is raised right to the upper edge of the side members and the lower side cores are grouped around it, either parallel or in a ring, so that, after the securing together of all the mold and side cores around the central core, either annular or parallel pressure chambers are obtained, adapted to co-operate with parallel or annular injection plungers respectively. In this way the output can be further substantially increased or specially shaped pieces be molded without difficulty.

Referring to the accompanying drawings illustrating the invention, by way of example:

Figs. 1, 2 and 3 illustrate one form of construction, in which Figures 1 and 2 are respectively front and side elevations partly in section and Figure 3 is a plan view;

Figure 5:
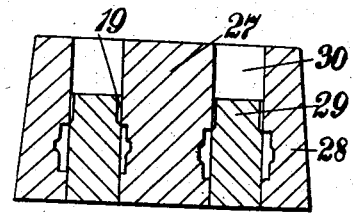
Figure 5A:
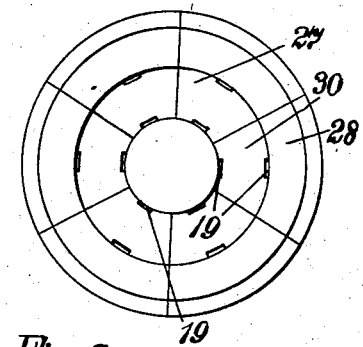
Figure 6:
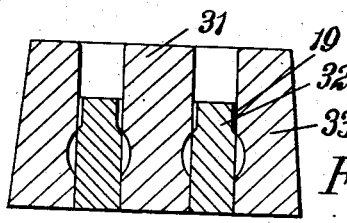
Figure 6A:
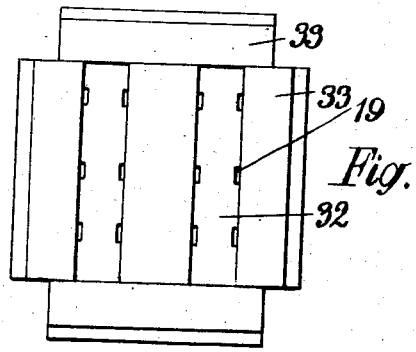

Figs. 5 and 5a a sectional elevation and plan view respectively of a third form of construction; and Figs. 6 and 6a a sectional elevation and plan view respectively of a further form of construction.

Figures 1, 2:
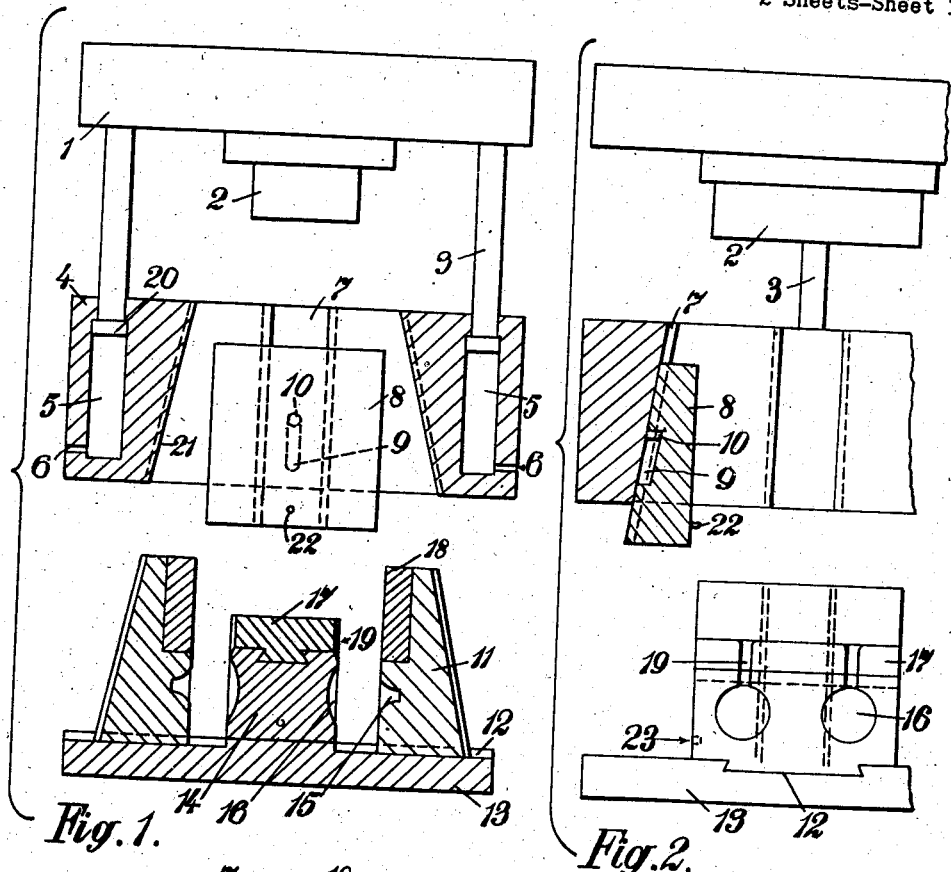
Figure 3:
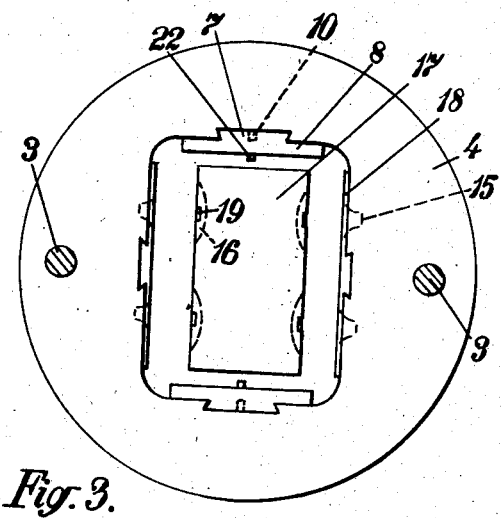

Referring to the construction shown in Figures 1, 2 and 3, 1 is the top plate of the apparatus, which is secured to the top plate of the press, or is directly connected to the piston of the press and goes up and down with the latter. In the middle of the same there is mounted the injection plunger 2 whilst fixed pistons 3 are secured near its edge. 4 is the inner conical holding ring, which contains the cylinders 5 for the pistons 3. 6 are the inlet ducts for the pressure medium acting in the cylinders 5. 7 are inner guides, in which the pressure chamber parts 8 can slide, this sliding movement being, however, limited by the engagement of a slot 9 and pin 10 provided on the part 8 and in the guide 7 respectively. 11 are conical jaws adapted to slide in guides 12 provided on a base plate 13. In the middle of this plate 13 stands secured a central member 14. The mold cavities 15 and 16 are formed in the jaws 11 and central member 14 respectively. The central member carries a readily exchangeable mounting 17. 18 are also readily exchangeable mountings secured in the jaws 11.

The operation of the molding apparatus is as follows: When the plate 1 descends under the pressure which is applied, the ring 4 descends too over the mold parts 11, the pressure-chamber-forming parts 8 strike against the base plate 13 and are pressed against the central core and against one another simultaneously with the parts 11 owing to the action of the tapered surfaces on the parts 11 and ring 5, and held fast by the pressure of the piston 3. The mold is now closed, the pressure-chamber is formed, which is now filled with material, and the injection plunger 2 descends into the pressure-chamber. Under the action of pressure and heat the material plastifies and is injected through the ducts 19 provided in the mounting 17 and central member 14 into the mold cavities 15 and 16. If the ducts prove to be too long or too short, the correct length can readily be adjusted by changing or grinding off the part 17. After the termination of the injection, the plate 1 is raised, but under the pressure of the pistons 3 the ring remains in its position and the injection plunger is drawn out of the pressure chamber. With further movement of the plate 1, the widened ends 20 of the pistons 3 lift the ring off the mold members. The guides 21 slide upwards on the parts 11 and draw the latter outwards, and so do the guides 7 with respect to the parts 8. The latter remain stationary in the lowest position as long as the pin 22 is in the hole 23. However, as soon as this pin is freed by the outward movement of the member 8, the pin 10 raises the member 8 with it. The mold is now completely open, the pressure chamber is completely disassembled, and the moldings and the waste material can be removed or drop out so that the apparatus is ready for the next molding operation.

Figure 4:
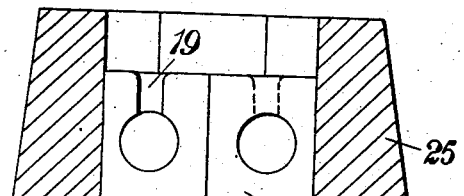
Figs. 4 and 4a are a sectional elevation and plan view respectively of a second form of construction.
Figure 4A:
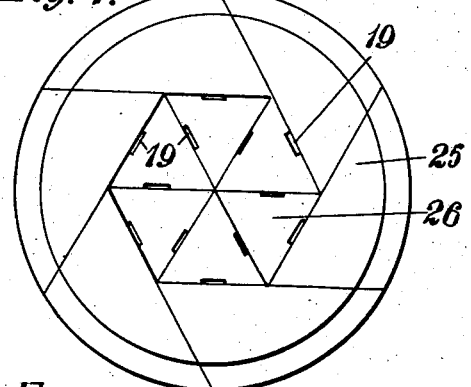

Referring to Figures 4 and 4a illustrating another form of construction, the central member 24 is hexagonal, and the mold-dividing surfaces 25 are accordingly at an angle of 60 degrees with respect to one another. The central member 24 is itself divided into six parts 26, so that further mold cavities can be provided on each of their dividing surfaces. The shape of the injection plunger is, of course, made to correspond to that of the pressure-chamber, viz., hexagonal.

In the form of construction illustrated in Figures 5 and 5a, the central core member 27 is made cylindrical and of the same height as the outer mold parts 28, which are in the form of ring segments. Between the central member 27 and the annular segments 28 there are provided intermediate ring segments 29, which are of shorter height than 27 and 28. 30 is the annular pressure chamber which is formed by the internally conical ring when the same descends over the mold parts, as in the case of the construction shown in Figures 1 to 3. The injection plunger in this case is of course of annular shape.

In the form of construction shown in Figures 6 and 6a, the central member 31 is elongated and on the right and left thereof there are provided lower elongated members 32 followed by the outer mold parts 33. In this case two elongated parallel pressure-chambers 34 are formed above the intermediate members 32 intended to co-operate simultaneously with respective correspondingly shaped injection plungers.

In all the Figures 4, 4a, 5, 5a, 6 and 6a, 19 are the injection passages between the pressure chamber and the mold cavities.

What I claim is:

1. An injection molding apparatus for synthetic materials, comprising a base, a central member secured to the said base, a plurality of side members disposed around the said central member and mounted on the said base for movement to and fro with respect to the said central member, said central and side members having facing mold-dividing surfaces formed with recesses, the said side members extending beyond the top of the central member, whereby, when the said facing mold-dividing surfaces are in contact with one another, the said recesses form together molding cavities, and a pressure chamber is also formed by the top of the central member and the parts of the side members which extend beyond the said top, passages leading from the said molding cavities to the said pressure chamber, an injection plunger capable of upward and downward movement and means for sliding the said side members to and fro with respect to the central member simultaneously with the downward and upward movements of the injection plunger respectively.

2. An injection molding apparatus for synthetic materials, comprising a base, a central member secured to the said base, a plurality of side members disposed around the said central member and mounted on the said base for movement to and fro with respect to the said central member, the said central and side members having a plurality of facing mold-dividing surfaces lying in different planes and formed with recesses, the said side members extending beyond the top of the central member whereby, when the said facing mold-dividing surfaces are in contact with one another, the said recesses form together molding cavities, and a pressure chamber is also formed by the top of the central member and the parts of the side member which extend beyond the said top, passages leading from the said molding cavities to the said pressure chamber, an injection plunger capable of upward and downward movement and means for sliding the said side members to and fro with respect to the central member simultaneously with the downward and upward movements of the injection plunger respectively.

3. An injection molding apparatus for synthetic materials, comprising a base, a central member secured to the said base, a plurality of side members disposed around the said central member and mounted on the said base for movement to and fro with respect to the said central member, the said central and side members having a plurality of mold-dividing surfaces lying in different planes forming an angle with one another, recesses in the facing mold-dividing surfaces of the said central and side members, the said side members extending beyond the top of the central member whereby, when the said facing mold-dividing surfaces are in contact with one another, the said recesses form together molding cavities, and a pressure chamber is also formed by the top of the central member and the parts of the side member which extend beyond the said top, passages leading from the said molding cavities to the said pressure chamber, an injection plunger capable of upward and downward movement and means for sliding the said side members to and fro with respect to the central member simultaneously with the downward and upward movements of the injection plunger respectively.

4. An injection molding apparatus for synthetic materials, comprising a base, a central member secured to the said base, a plurality of side members disposed around the said central member and mounted on the said base for movement to and fro with respect to the said central member, the central and the side members having facing mold-dividing surfaces arranged along a cylindrical surface, recesses in the facing mold-dividing surfaces of the said central and side members, the said side members extending beyond the top of the central member, whereby, when the said facing mold-dividing surfaces are in contact with one another, the said recesses form together molding cavities, and a pressure chamber is also formed by the top of the central member and the parts of the side members which extend beyond the said top, passages leading from the said molding cavities to the said pressure chamber, an injection plunger capable of upward and downward movement and means for sliding the said side members to and fro with respect to the central member simultaneously with the downward and upward movements of the injection plunger respectively.

5. An injection molding apparatus for synthetic materials, comprising a base, a central member secured to the said base, a plurality of side members disposed around the said central member and mounted on the said base for movement to and fro with respect to the said central member, the said central and side members having a plurality of facing mold-dividing surfaces lying in different planes forming an angle with one another, recesses in the facing mold-dividing surfaces of the said central and side members, the said side members extending beyond the top of the central member whereby, when the said facing mold-dividing surfaces are in contact with one another, the said recesses form together molding cavities, and a pressure chamber is also formed by the top of the central member and the parts of the side member which extend beyond the said top, passages leading from the said molding cavities to the said pressure chamber, an injection plunger capable of upward and downward movement and means for sliding the said side member to and fro with respect to the central member simultaneously with the downward and upward movements of the injection plunger respectively, the central member being divided into parts have facing mold-dividing surfaces at an angle to one another and to the first mentioned mold-dividing surfaces.

6. An injection molding apparatus for synthetic materials, comprising a base, a central member secured to the said base, a plurality of side members disposed around the said central member and mounted on the said base for movement to and fro with respect to the said central member, the said central and side members having a plurality of facing mold-dividing surfaces lying in different planes forming an angle with one another, recesses in the facing mold-dividing surfaces of the said central and side members, the said side members extending beyond the top of the central member whereby, when the said facing mold-dividing surfaces are in contact with one another, the said recesses form together molding cavities, and a pressure chamber is also formed by the top of the central member and the parts of the side member which extend beyond the said top, passages leading from the said molding cavities to the said pressure chamber, an injection plunger capable of upward and downward movement and means for sliding the said side members to and fro with respect to the central member simultaneously with the downward and upward movement of the injection plunger respectively, the central member being of hexagonal shape and divided into parts having mold-dividing surfaces at an angle to one another and to the first mentioned mold-dividing surfaces.

7. An injection molding apparatus as claimed in claim 2, the central member being divided into parts having facing mold-dividing surfaces parallel to one another and to the first mentioned mold-dividing surfaces.

8. An injection molding apparatus as claimed in claim 2, in which two injection plungers are provided and the central member is divided into elongated middle and outer parts having facing mold-dividing surfaces parallel to one another and to the first mentioned mold-dividing surfaces, the middle member of the divided central member being of greater height than the outer parts whereby the pressure chamber is divided into two parts cooperating with the two pistons.

9. An injection molding apparatus for synthetic materials, comprising a base, a central core secured to the said base, a plurality of ring segments disposed around the said central core and mounted on the said base for movement to and fro with respect to the said central core and of shorter height than the central core, a plurality of side members in the shape of ring segments and of the same height as the central core arranged around the ring segments of shorter height and mounted on the base for movement to and fro with respect to the ring segments of shorter height, said central core and ring segments of shorter height having facing mold-dividing surfaces and the ring segments of shorter and greater height having additional facing mold-dividing surfaces, recesses in said mold-dividing surfaces, whereby when the said facing mold-dividing surfaces are in contact with one another the said recesses form together molding cavities, and a pressure chamber of annular shape is also formed above the ring segments of shorter height between the central core and the ring segments of greater height, and passages leading from the said molding cavities to the said pressure chamber, and an injection plunger capable of upward and downward movement.

10. An injection molding apparatus as claimed in claim 1, in which an easily removable and exchangeable plate is mounted on one of said members, the said plate having therein the passages leading from the pressure chamber to the molding cavities.

11. An injection molding apparatus as claimed in claim 1, in which removable plates are mounted on those portions of the members which form the side walls of the pressure chamber.

12. An injection molding apparatus as claimed in claim 1, in which the means for sliding the side members to and fro with respect to the central member comprises a top plate carrying the injection plunger and a ring for the assembling and disassembling of the side members with the central member, the said ring having an internal surface which tapers towards its lower end and a number of guiding recesses corresponding to the number of side members, the latter having a tapered surface in engagement with the corresponding guiding recess in the tapered surface of the ring, and yielding connecting means between the top plate and the ring consisting of pressure cylinders formed in the ring and piston attached to the top plate and engaging in the said cylinders.

ALFONSO AMIGO.